United States Patent [19]

Masaki

[11] Patent Number: 4,907,193

[45] Date of Patent: Mar. 6, 1990

[54] WORD PROCESSOR USING CHARACTER GROUP DISCRIMINATION CODES FOR VARIABLE PITCH AND LOGOTYPE CHARACTER CONTROL PRINTING

[75] Inventor: Katsumi Masaki, Sagamihara, Japan

[73] Assignee: Canon Kabushiki Kaisha, Tokyo, Japan

[21] Appl. No.: 300,219

[22] Filed: Jan. 24, 1989

Related U.S. Application Data

[63] Continuation of Ser. No. 765,551, Aug. 12, 1985, abandoned, which is a continuation of Ser. No. 640,540, Aug. 14, 1980, abandoned, which is a continuation of Ser. No. 305,044, Sep. 23, 1981, abandoned.

[30] Foreign Application Priority Data

Sep. 29, 1980 [JP] Japan ............................ 55-135565

[51] Int. Cl.⁴ ...................... B41J 19/58; G06F 3/153; G06F 3/12
[52] U.S. Cl. .................... 364/900; 340/735; 400/95; 400/61; 400/83; 400/279; 364/926.7; 364/930; 364/930.4; 364/943; 364/943.4; 364/943.43
[58] Field of Search ... 364/200 MS File, 900 MS File, 364/519, 521, 522, 523; 400/61-63, 76, 83, 95, 103, 121, 124, 279; 340/731, 735

[56] References Cited

U.S. PATENT DOCUMENTS

| | | | |
|---|---|---|---|
| 3,557,927 | 1/1971 | Wright | 400/95 |
| 3,648,271 | 3/1972 | McConell et al. | 364/900 |
| 3,674,125 | 7/1972 | Kolpek | 400/12 X |
| 3,893,100 | 7/1975 | Stein | 340/731 |
| 3,999,168 | 12/1976 | Findley et al. | 364/900 |
| 4,000,495 | 12/1976 | Pirtle | 354/7 |
| 4,010,837 | 3/1977 | Gremillet | 400/99 |
| 4,138,719 | 2/1979 | Swanstrom et al. | 364/200 |
| 4,146,874 | 3/1979 | Ide et al. | 382/56 |
| 4,149,145 | 4/1979 | Hartke et al. | 340/739 |
| 4,174,174 | 11/1979 | Hunter, Jr. et al. | 355/39 |
| 4,187,031 | 2/1980 | Yeh | 400/83 |
| 4,200,369 | 4/1980 | Richards et al. | 354/7 |
| 4,225,249 | 9/1980 | Kettler | 400/3 |
| 4,240,119 | 12/1980 | Norton et al. | 358/297 |
| 4,254,409 | 3/1981 | Busby | 340/731 |
| 4,264,226 | 4/1981 | Bowles et al. | 400/709.1 |
| 4,286,329 | 8/1981 | Goertzel et al. | 364/900 |
| 4,310,840 | 1/1982 | Williams et al. | 340/724 |
| 4,326,813 | 4/1982 | Lomicka, Jr. et al. | 400/124 |
| 4,342,096 | 7/1982 | McDevitt | 364/900 |
| 4,348,738 | 9/1982 | Grier et al. | 364/900 |
| 4,371,274 | 2/1983 | Jaeger | 400/121 |
| 4,372,696 | 2/1983 | Pczi | 400/124 |
| 4,374,625 | 2/1983 | Hanft et al. | 400/98 |
| 4,392,197 | 7/1983 | Couper et al. | 364/200 |
| 4,396,992 | 8/1983 | Hayashi et al. | 364/900 |
| 4,447,888 | 5/1984 | Kuecker et al. | 364/900 |
| 4,451,899 | 5/1984 | Yamazaki | 364/900 |
| 4,459,049 | 7/1984 | Howell | 400/98 |
| 4,464,070 | 8/1984 | Hanft | 400/98 |
| 4,470,042 | 9/1984 | Barnich | 340/721 |
| 4,500,216 | 2/1985 | Demonte et al. | 400/8 |

FOREIGN PATENT DOCUMENTS

| | | | |
|---|---|---|---|
| 31446 | 7/1981 | European Pat. Off. | 400/98 |
| 37793 | 11/1981 | European Pat. Off. | 400/98 |
| 2026748 | 2/1980 | United Kingdom | 400/98 |
| 2091524 | 7/1982 | United Kingdom | 364/518 |

OTHER PUBLICATIONS

D. E. Cutshall & D. M. Steinbauer, *Logotype Printer*, IBM Technical Disclosure Bulletin, vol. 22 No. 4 (Sep. 1979) pp. 1587–1588.

G. W. Doyle et al., IBM Tehnical Disclosure Bulletin, *Word Printing Typewriter* (vol. 23 No. 2, Jul. 1980), p. 683.

IBM Tech. Discl. Bulletin, vol. 27, No. 10B, Mar. 1985, "*Multiple Pitch Alphanumeric Display Adapter*", pp. 6290–6296.

(List continued on next page.)

Primary Examiner—Archie E. Williams, Jr.
Assistant Examiner—Florin Munteanu-r
Attorney, Agent, or Firm—Fitzpatrick, Cella, Harper & Scinto

[57] ABSTRACT

A word processing apparatus is capable of logotype printing with a standard dot matrix pattern, and is controlled as to provide zero spacing between characters at logotype printing.

9 Claims, 12 Drawing Sheets

OTHER PUBLICATIONS

IBM Technical Disclosure Bulletin (vol. 22, No. 8B, Jan. 1980), T. Nohzawa, "*Proportionally Spaced Dot Matrix Display and Printer*", pp. 3742-3743.

T. Sato, "*Discharge Printers Feature Microcomputer Control,*" JEE (vol. 16, No. 152, Aug. 1979).

J. J. Ignoffo et al. "*Managing Dot-Matrix Printing With a Microprocessor,* " Hewlett-Packard Journal (vol. 29, No. 15, Nov. 1978).

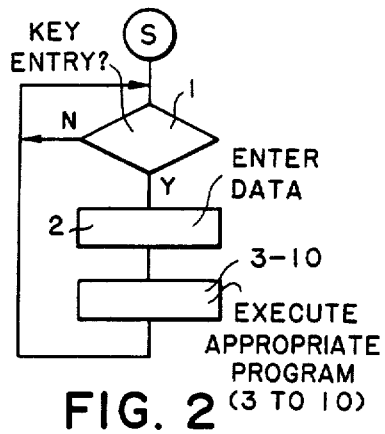
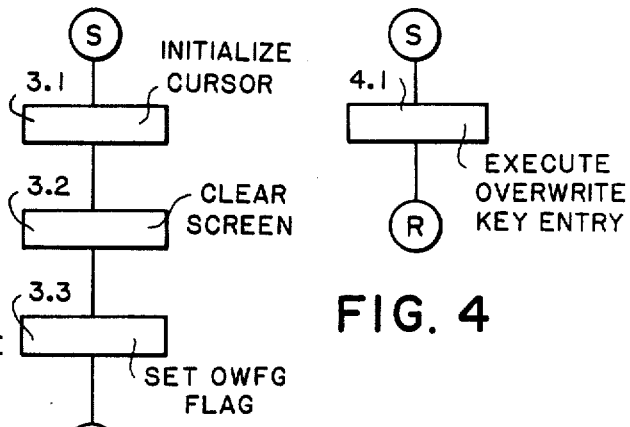
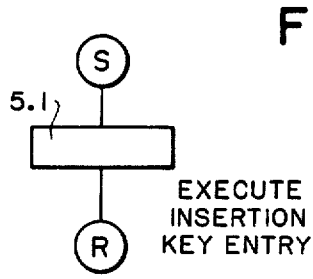
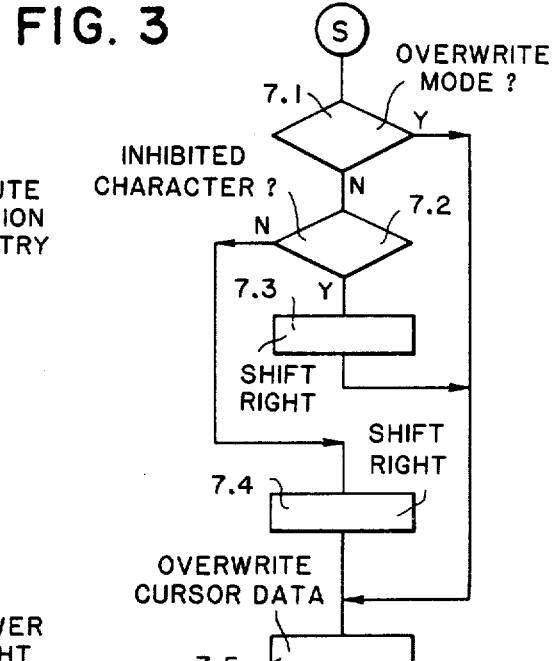
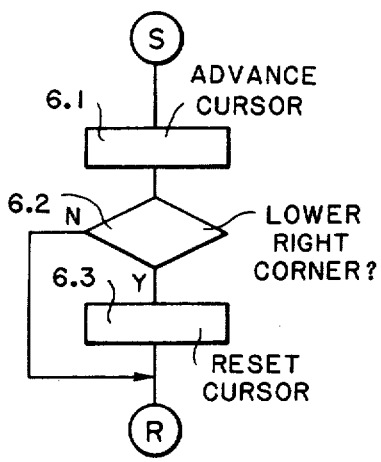
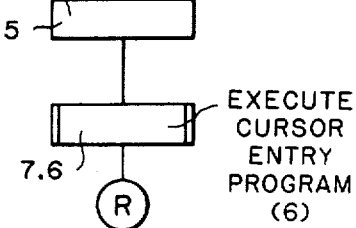

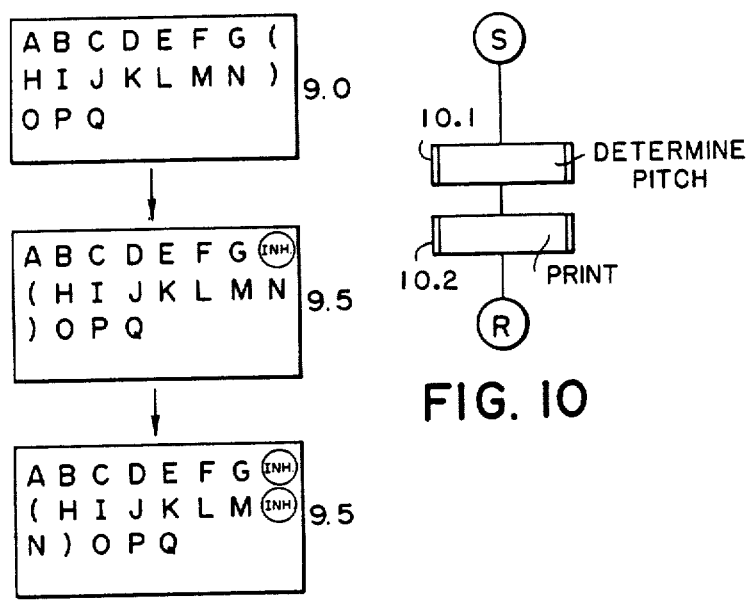
FIG. 9B
FIG. 10
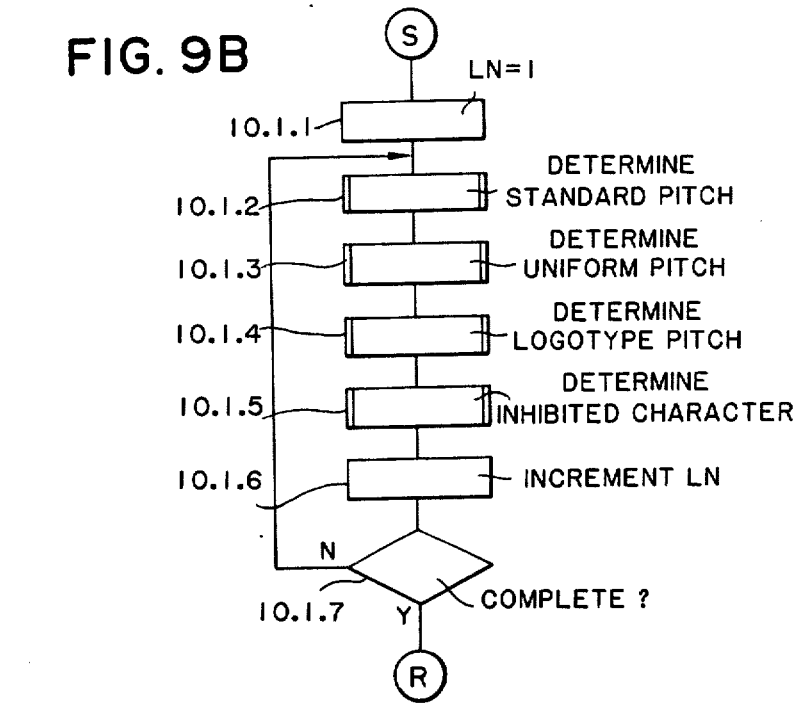
FIG. 11A

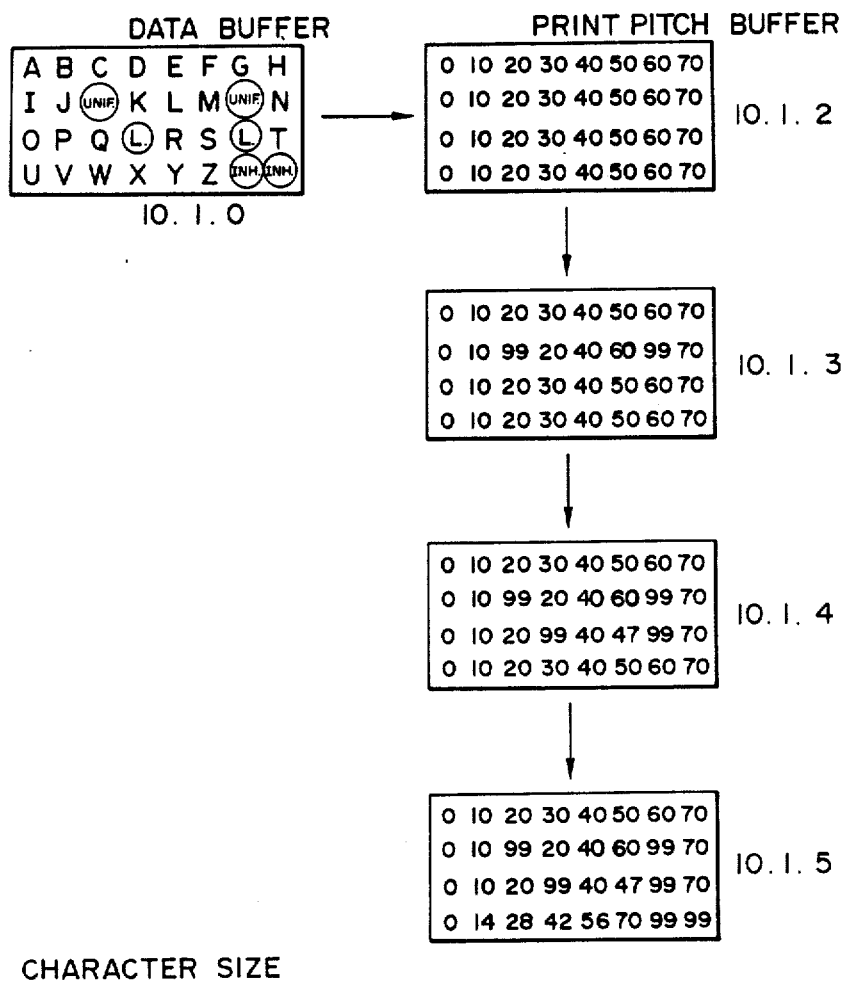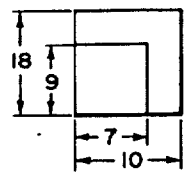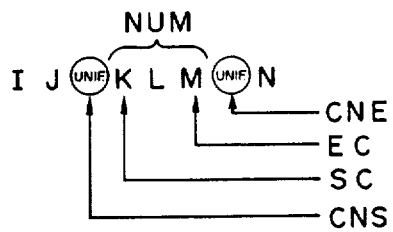
FIG. 11B

WORD PROCESSOR USING CHARACTER GROUP DISCRIMINATION CODES FOR VARIABLE PITCH AND LOGOTYPE CHARACTER CONTROL PRINTING

This application is a continuation of application Ser. No. 765,551 filed Aug. 12, 1985, which was a continuation of Ser. No. 640,540 filed Aug. 14, 1984, which was a continuation of Ser. No. 305,044 filed Sept. 23, 1981, all of which are now abandoned.

BACKGROUND OF THE INVENTION

1. Field of the Invention

The present invention relates to a word processing apparatus for electronic processing of a series of characters.

2. Description of the Prior Art

A logotype is a single slug of type cast in one piece, which may include one or more words, a trademark, and other art work and which may employ a special style of type. There is already known a dot matrix printer capable of logotype printing forming a partial graphic pattern on a dot matrix expanded to cover the spacing between rows and between adjacent characters and forming the entire graphic pattern by printing such partial patterns in a consecutive manner. In such printer the printing position of each partial pattern can remain the same as that of normal character printing, but there is required a special processing for such expanded dot matrix.

SUMMARY OF THE INVENTION

In consideration of the foregoing, an object of the present invention is to provide an improved word processing apparatus.

Another object of the present invention is to provide a word processing apparatus capable of logotype printing using, instead of an expanded dot matrix, a standard dot matrix for ordinary character printing, which is so controlled, as to provide zero spacing between synthesized characters when printed.

Still other objects of the present invention will be made apparent from the following description of the preferred embodiments to be taken in conjunction with the attached drawings.

BRIEF DESCRIPTION OF THE DRAWINGS

FIG. 2 is a flow chart showing the control procedure of a keyboard process;

FIG. 3 is a flow chart showing the input procedure of an initializing key;

FIG. 4 is a flow chart showing the input procedure of an overwrite key;

FIG. 5 is a flow chart showing the input procedure of an insertion key;

FIG. 6 is a flow chart showing the input procedure of a cursor key;

FIG. 7A is a flow chart showing the input procedure of a character key;

FIG. 9B is a chart showing the manner of corresponding data shift;

FIG. 10 is a flow chart showing the input procedure a print key;

FIG. 11A is a flow chart showing the pitch determining procedure;

FIG. 11B is a chart showing the manner of corresponding data shift;

DESCRIPTION OF THE PREFERRED EMBODIMENTS

Figure 1:
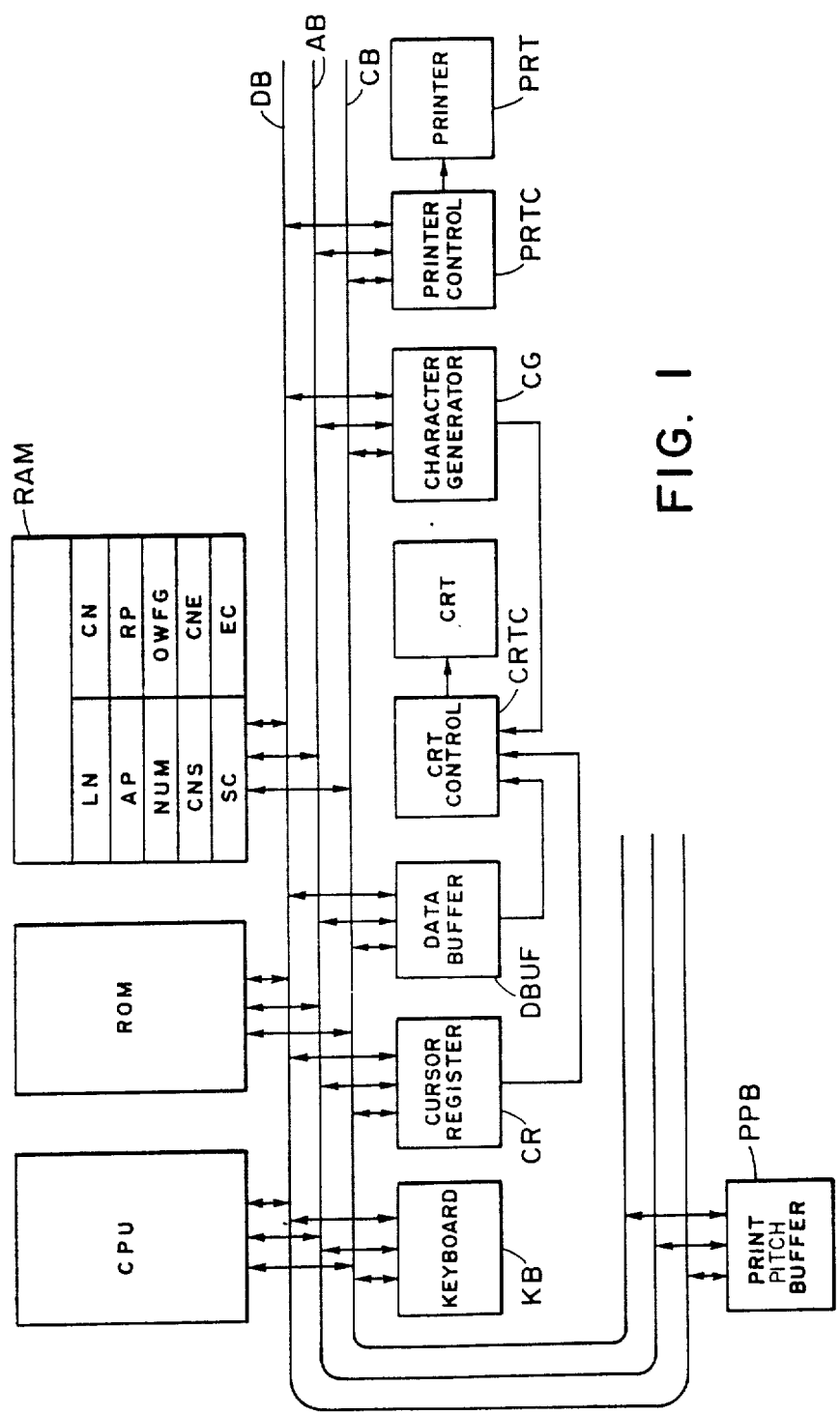
FIG. 1 is a block diagram showing an embodiment of the present invention.

At first there will be explained certain terms employed in the following description of the embodiments of the present invention:

1. Uniform division code: The uniform division code can be entered by actuating a uniform division key. A series of characters present between two uniform division codes is uniformly distributed at the printout within an area defined by said codes.
2. Logotype code: A logotype code can be entered by actuating a logotype key. A series of characters present between two logotype codes is printed with zero spacing between synthesized characters.
3. Row-head inhibited character processing: In any language, particularly in Japanese language, certain characters or symbols will look unnatural because of grammatrical or other reason if they are positioned at the head of a row, but such characters or symbols may become positioned at the row head in the course of word processing. In such case an automatic rearrangement of the rows of characters is conducted by the actuation of a corresponding key. Examples of such characters inhibited at the row head include ")", ".", ",", "]", "}" and certain Japanese phonetic characters.
4. Row-end inhibited character processing: In any language, particularly in Japanese language, certain characters or symbols will look unnatural because of grammatrical or other reason if they are positioned at the end of a row, but such characters or symbols may become positioned at the row end in the course of word processing. In such case an automatic rearrangement of the rows of characters is conducted by the actuation of a corresponding key. Examples of such characters inhibited at the row end include "(", "[", "{" and "$".

Now there will be outlined the embodiments of the present invention. A keyboard is utilized for entering character information and various function information, and the character information entered from said keyboard is displayed on a display unit for editing procedures such as insertion, overwriting or deletion. The position of data entry on the display unit can be arbitrarily selected by a cursor controlled by cursor keys. In case of logotype printing, the partial patterns of the desired logotype are encoded, and the series of obtained codes is positioned between two logotype codes. The logotype code can be entered by a logotype key, and the above-mentioned partial pattern codes can be entered by corresponding keys provided on the keyboard.

The logotype printing is achieved with zero spacing between characters whereby the partial patterns are united to provide the desired logotype pattern.

In case of uniformly divided printing, the area to be uniformly divided is designated by the uniform division codes between which a series of characters is entered. In this mode a space code preceding or succeeding a series of characters is not considered as a character subjected to the uniform division even when said space code is positioned between two uniform division codes. The uniform division code can be entered by the actuation of a uniform division key.

For conducting automatic inhibited character processing on the series of characters entered in the above-mentioned manner, the inhibited character processing key is actuated whereby the inhibited characters positioned at the head or end of rows are shifted from such positions as shown in FIG. 9B and inhibited character codes, represented by INH., are inserted in said positions.

Figure 7B:
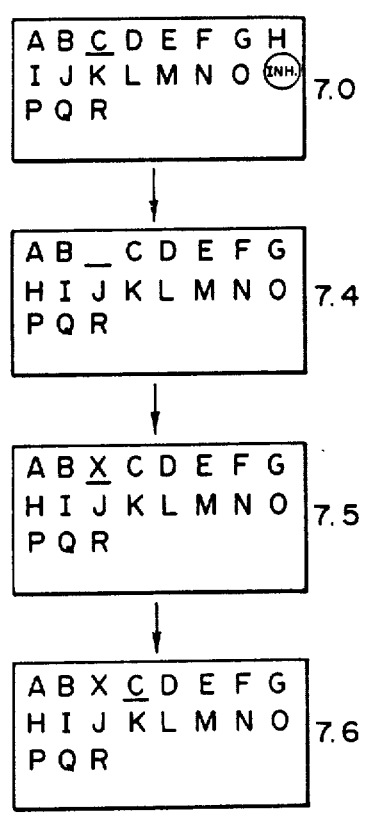
FIG. 7B is a chart showing the manner of data shift.

In case of inserting or deleting a character in the thus processed characters, a particular processing is executed on said inhibited character code. When a character is inserted, the inhibited character code is annihilated by the preceding row of characters as shown in FIG. 7B. On the other hand, when a character is deleted, a new inhibited character code is added as shown in FIG. 8B. In this manner it is intended to minimize the presence of characters in the inhibited positions resulting from editing process after the aforementioned inhibited character processing.

The series of characters completed on the cathode ray tube is printed on paper upon actuation of a print key.

At the printing, the characters designated for uniform division or logotype printing are printed in respectively designated positions. In a row having an inhibited character mark INH., said mark is deleted at the printing operation and the remaining characters are arranged in uniformly divided manner within the left and right margin limits.

Now reference is made to FIG. 1 showing an embodiment of the present invention in a block diagram, wherein there are provided:

a microprocessor CPU for calculation and logic processing;

an address bus line AB for transferring signals designating control loads;

a bidirectional data bus line DB for transferring various data;

a control bus line CB for transferring control signals to various control loads;

a keyboard KB comprising character information entry keys for entering alphanumeric characters, Japanese phonetic characters, symbols and other graphics corresponding to special patterns defined by the user, and function entry keys including an initializing key, an overwrite key, an insertion key, cursor keys, a deletion key, an inhibited character processing key and a print key;

a cathode ray tube controller CRTC for displaying the character data stored in a data buffer DBUF, to be explained later in character patterns in 8 columns and 4 rows on a cathode ray tube CRT of the display unit to be explained later, and for displaying a cursor on said cathode ray tube CRT in a position corresponding to the data stored in a cursor register CR to be explained later;

a cursor register CR for storing the position data of the cursor to be displayed on said cathode ray tube CRT;

a data DBUF storing the data entered from the keyboard KB and having a capacity for storing character information of 8 columns times 4 lines or rows;

a cathode ray tube CRT for displaying character information and cursor;

a character generator CG for displaying characters on the cathode ray tube CRT, and also for converting character codes into character patterns at the printout, and storing $9 \times 7$ dot matrix character patterns for these purposes;

a dot printer PRT having a thermal printing head of $9 \times 1$ dot matrix (9 dots in a vertical column) and controlled by a printer controller PRTC;

a printer controller PRTC adapted for controlling the printing operation of said printer PRT according to the character pattern information from the microprocessor CPU, controlling the lateral movement of the printer head according to the information from said microprocessor CPU and performing, in response to a carriage return instruction or a line feed instruction from the microprocessor CPU, a corresponding operation in the printer PRT, thereby performing the dot pitch control of the thermal head in the lateral direction and thereby printing each character with a $9 \times 7$ dot matrix through the lateral dot-pitch displacement of the $9 \times 1$ thermal head;

a random access memory RAM for temporary storage of various data, including registers LN, CN, AP, RP, NUM, CNS, CNE, SC, EC etc. and memories for the overwrite flag OWFG and other current parameters utilized by the microprocessor CPU during the execution of the program;

a read-only memory ROM for storing the sequence programs shown in FIG. 2 and thereafter; and a print pitch buffer PPB for storing, in dot units, the absolute addresses in lateral direction of the actual print positions of the print data stored in the data buffer DBUF.

In the following the function of the above-explained embodiment will be explained in detail, while making reference to FIGS. 2-19.

At first there will be explained the meaning of various parameters and symbols employed in the following description, which will also be used to indicate the corresponding registers:

LN: a current parameter indicating the line or row number;

CN: a current parameter indicating the column number;

$C_{LN,CN}$: a code in the data buffer DBUF corresponding to a line LN and a column CN;

$A_{LN,CN}$: a number in the print pitch buffer PPB corresponding to a line LN and a column CN, indicating the lateral print position of $C_{LN,CN}$ in dot unit;

NUM: a parameter indicating the number of characters;

CNS: a starting column number of the area to be uniformly divided;

CNE: an ending column number of the area to be uniformly divided;
SC: a starting column number of the character series to be uniformly divided;
EC: an ending column number of the character series to be uniformly divided;
AP: quotient
RP: residual In response to a key actuation in the keyboard, KB, a keyboard program is executed as shown in FIG. 2, which consists of the steps:
1: Key entry from keyboard?
2: Data entry from keyboard; and
3 to 10: Program execution according to the entered data.

These steps will be further explained in the following. The present keyboard program is activated at the start of power supply, and the data entry from the keyboard KB is detected in the Step 1. In the presence of data entry the program proceeds to the Step 2 for receiving thus entered data, and executes, various programs in the Steps 3 to 10 according to the thus entered data. More specifically, there is executed is an initializing key entry program (3) shown in FIG. 3 in case of an entry from the initializing key; an overwrite key entry program (4) shown in FIG. 4 in case of entry from the overwrite key; an insertion key entry program (5) shown in FIG. 5 in case of entry from the insertion key; a cursor key entry program (6) shown in FIG. 6 in case of enter from the cursor keys; a character key entry program (7) shown in FIG. 7A in case of an entry from the character keys, logotype key or uniform division key; a deletion key entry program (8) shown in FIG. 8A in case of entry from the deletion key; an inhibited character process key entry program (9) shown in FIG. 9A in case of entry from the inhibited character process key; or a print key entry program (10) shown in FIG. 10 in case of entry from the print key.

In case the initializing key is actuated, the program proceeds from the Step 2 to the initializing key entry program shown in FIG. 3, which consists of the steps:
3.1: Set "1" in the cursor register CR;
3.2: Fill data buffer DBUF with space codes; and
3.3: Set overwrite flag OWFG.

Functions of these steps are as follows:
3.1: Prior to the start of signal entry the initializing key is always actuated to execute the initializing key entry program, whereby data "1" is set in the cursor register CR to shift the cursor to the upper left corner of the cathode ray tube CRT;
3.2: Fill the data buffer DBUF with space codes to clear the screen of the cathode ray tube CRT; and
3.3: Set the overwrite flag OWFG.

Upon completion of the above-mentioned steps the program returns to the original state. In case the overwrite key is actuated, the program sets tee overwrite flag OWFG to "1" and returns to the key entry stand-by state as shown in FIG. 4.

In case the insertion key is actuated, the program resets the overwrite flag and returns to the key entry stand-by state as shown in FIG. 5.

In case the cursor key is actuated, executed is the program shown in FIG. 6, which consists of the steps:
6.1: Cursor register CR increment;
6.2: Cursor register CR ≧ 33?; and
6.3: Set cursor register CR to "1": whereby the cursor is step advanced. When the cursor reaches the lower right corner of the cathode ray tube CRT, it is then shifted to the upper left corner.

In case a character key is actuated, there is executed the program shown in FIG. 7A which consists of the steps:
7.1: Overwrite mode (OWFG=1)?
7.2: Is inhibited character code INH. present after the cursor position?
7.3: Shift all the data to the right, starting from the cursor position to a position immediately preceding said inhibited character code INH;
7.4: Shift all the data to the right, starting from the cursor position;
7.5: Overwrite the entered data in the cursor position; and
7.6: Execute cursor key entry program (6). Functions of these steps are as follows:
7.1: The executed program differs according to whether the overwrite mode or the insertion mode is selected. In the former case where the overwrite flag OWFG is set, the program proceeds to the Step 7.5. In the latter case where the overwrite flag OWFG is reset, the program proceeds to the Step 7.2.
7.2: The program proceeds to the Step 7.3 or 7.4 respectively when the inhibited character code INH. is present or absent in the data following the cursor position.
7.3: For the purpose of character insertion, the existing characters are shifted to the right by one character, starting from the cursor position to the succeeding first inhibited character code INH., whereby said code is annihilated because of said shifting. Thereafter the program proceeds to the Step 7.5.
7.4: All the characters starting from the cursor position are shifted to the back right by one character, and the last character is discarded.
7.5: The entered data are written into the cursor position.
7.6: The cursor key entry program (6) is executed for step advancing the cursor position.

FIG. 7B shows an example of character insertion, wherein, as shown in a diagram corresponding to the Step 7.4, the inhibited character code INH. is annihilated and the shifting does not affect the characters present subsequent to said code. The numbers shown in FIG. 7B or ensuing numbered drawings with suffix B correspond to the steps in FIG. 7A or the correspondingly numbered drawings with suffix A.

Figure 8A:
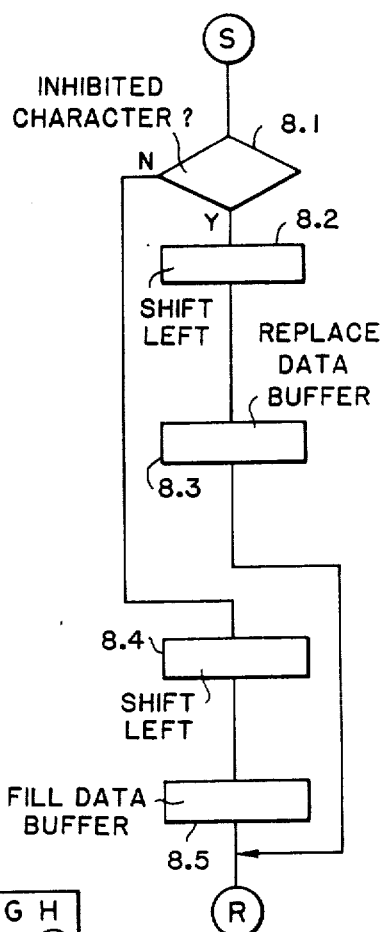
FIG. 8A a flow chart showing the input procedure of a deletion key.
Figure 8B:
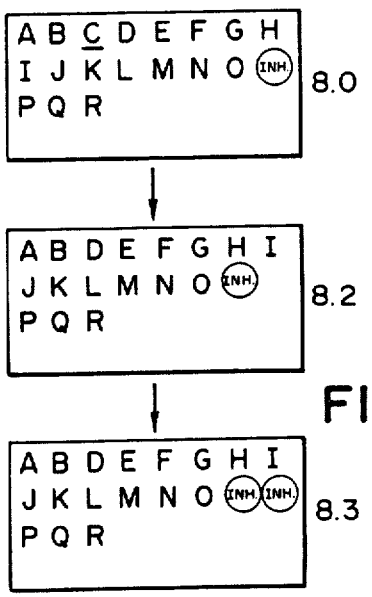
FIG. 8B is a chart showing the manner of data shift.

In case the deletion key is actuated, the program is executed as shown in FIG. 8A which consists of the following steps:
8.1: Is inhibited character code INH. present after the cursor position?
8.2: Shift all the data in data buffer DBUF to the left by one character, starting from a position next to the cursor position to the position of said inhibited character code INH.
8.3: Replace the content of data buffer DBUF corresponding to the former position of inhibited character code INH. with an inhibited character code INH.;
8.4: Shift all the data in data buffer DBUF to the left by one character, starting from a position next to the cursor position; and
8.5 Fill the last position of data buffer DBUF with a space code.

Functions of these steps are as follows:
8.1: The program proceeds to the Step 8.2 or 8.4 respectively when the inhibited character code INH. is present or absent in the data following the cursor position.

8.2: All the characters are shifted to the left by one character, starting from a position next to the cursor position to the position of said inhibited character code INH. The character at the cursor position is annihilated.

8.3: The content of data buffer DBUF at the former position of said inhibited character code INH. is replaced by an inhibited character code INH., whereby there will appear plural inhibited character codes INH. in succession. The program returns to the original state.

8.4 All the data in the data buffer DBUF are shifted to the left by one character, starting from a position next to the cursor position. The character at the cursor position is annihilated.

8.5: The last position of the data buffer DBUF filled with a space code.

FIG. 8B shows an example of the deletion key entry program, wherein there are generated plural inhibited character codes INH. as shown in the diagram corresponding to the Step 8.3.

Figure 9A:
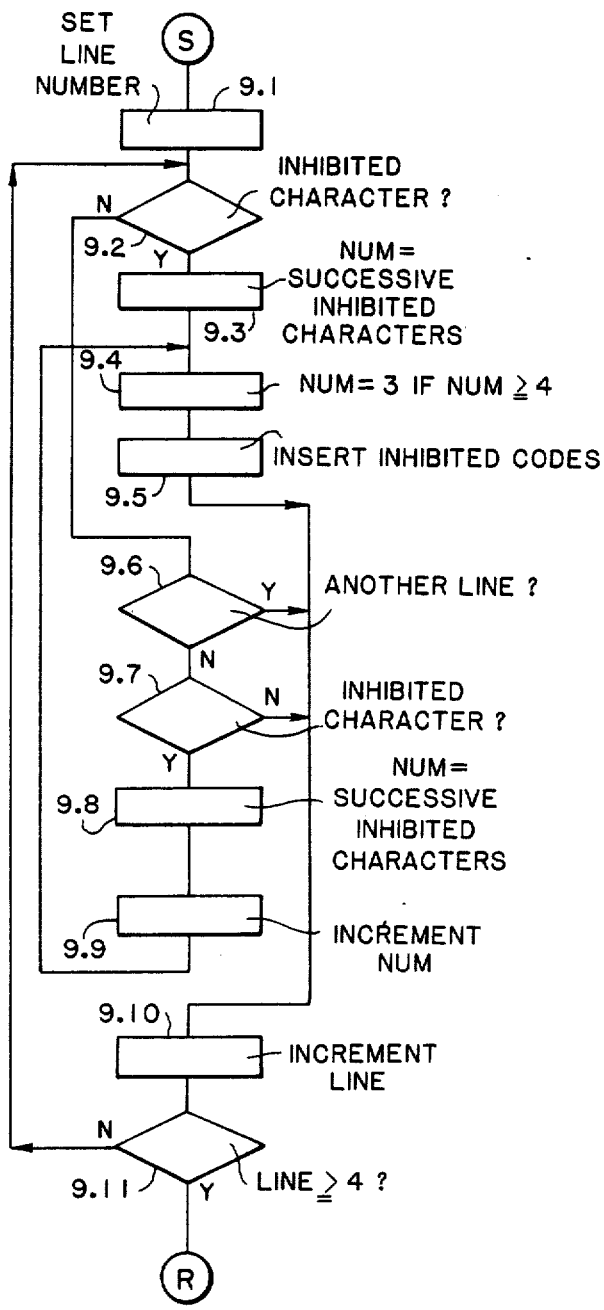
FIG. 9A is a flow chart showing the input procedure of an inhibited character processing input key.

In case the inhibited character process key is actuated, there is executed a program shown in FIG. 9A, which consists of the following steps:

9.1: Set the line number of cursor position in the register LN;

9.2: Is a character inhibited for line end present at a line end?

9.3: Check the number of line-end inhibited characters present in succession at the line end, and use said number as NUM;

9.4: Select NUM = 3 if said number is equal to or larger than 4;

9.5: Insert the inhibited character codes INH. of a number NUM for the line LN at a column position 9 - NUM;

9.6: LN ≧ 4?

9.7: Is a line-head inhibited character present at the head of line [LN + 1]?

9.8: Check the number of line-head inhibited characters present in succession at the head of line LN, and use said number as NUM;

9.9 NUM increment;

9.10: LN increment; and 9.11: LN > 4?

Functions of these steps are as follows:

9.1, 9.10 or 9.11: The steps 9.2 to 9.10 are repeated from the line of the cursor position to the last line.

9.2: Check is made if a line-end inhibited character is present at the line end. If present, the program proceeds to the Step 9.3 for executing the line-end inhibited character processing.

9.3: The number of line-end inhibited characters present in succession is checked, and said number is used as NUM.

9.4: NUM = 3 is selected if said number is equal to or larger than 4. Thus the inhibited character processing is conducted for three, characters at maximum.

9.5: Inhibited character codes INH. of a number indicated by NUM are inserted at a column position indicated by 9 - NUM, where "9" is the number of characters in a line plus one. The inserting program is identical with that shown in FIG. 7A. The program then proceeds to the Step 9.10.

9.6: Check is made if a next line exists. If it exists, there may be required the inhibited character processing for the line head. On the other hand, if the next line does not exist, such processing is not required and the program proceeds to the Step 9.10.

9.7: Check is made if a line-head inhibited character is present at the line head. If present, the program proceeds to the Step 9.8 for executing the inhibited character processing. If absent, the program proceeds to the Step 9.10.

9.8: Check is made if, line-head inhibited characters are present at the head of the present line, and the number of said characters is used as NUM.

9.9: NUM increment is conducted, and the program proceeds to the Step 9.4 where the NUM represents the number of characters to be subjected to the inhibited character processing.

In FIG. 9B, the diagram in the center indicates a state after the line-end inhibited character processing for the first line, and the diagram at the bottom indicates a state after the line-head inhibited character processing for the second line.

In case the print key is actuated, there is executed a program shown in FIG. 10, which consists of the following processes:

10.1 Pitch determining process; and 0.2: Printout process.

Functions of these steps are as follows:

10.1: Lateral pitch of the information to be printed is determined.

10.2: Information stored in the data buffer is printed according to thus determined pitch.

The Step 10.1 shown in FIG. 10 is further composed of the following steps, as shown in FIG. 11A:

10.1.1: Register LN = 1;

10.1.2: Standard pitch determining process;

0.1.3: Uniformly divided pitch determining process;

10.1.4: Logotype pitch determining process;

10.1.5: Inhibited character processing pitch determining process;

10.1.6: Register LN increment; and 10.1.7: Is process completed for all the lines?

Functions of these steps are as follows:

10.1.1, 10.1.6 and 10.1.7: Lateral pitch is determined for each line from the first to the last line.

10.1.2: Standard pitch determining process to be explained later.

10.1.3: Uniformly divided pitch determining process to be explained later.

10.1.4: Logotype pitch determining process to be explained later.

10.1.5: Inhibited character processing pitch determining process to be explained later. FIG. 11B shows an example of the pitch determining process, wherein the data stored in the data buffer DBUF, including uniform division codes UNIF. and logotype codes L., are represented by a diagram 10.1.0. A diagram 10.1.2 shows the contents of the print pitch buffer PPB after the standard pitch determining process wherein the numbers indicate the lateral absolute addresses of the printing of character codes in the data buffer DBUF. In the present embodiment each character is composed of a 9×7 dot matrix which is printed with a lateral standard pitch of 10 dots. For this reason the lateral absolute addresses in the print pitch buffer PPB assume the values shown in the diagram 10.1.2. A diagram 10.1.3 shows a state after the print pitch buffer PPB is corrected by uniform division process for the second line, whereby the print positions for the characters K, L and M are corrected. A code "99" in the print pitch buffer PPB indicates that the printing is not required.

Thus the character K, to be printed at the starting position of the uniformly divided area, has a lateral absolute print address of 20.

The character M, to be printed at the ending position of said area, has an address of 60.

The character L, to be printed in the center between the characters K and M, has an address of 40.

A diagram 10.1.4 shows the state of the print pitch buffer PPB after correction for the logotype printing in the third line, wherein the character R remains in the original position but the character S changes the address thereof to 47 as it is to be printed close to the character R.

A diagram 10.1.5 shows the state of the print pitch buffer PPB after the correction for the inhibited character processing for the fourth line, wherein the character U remains in the original position but the character Z changes its address to 70, and the characters between U and Z are uniformly distributed therebetween.

Figure 12:
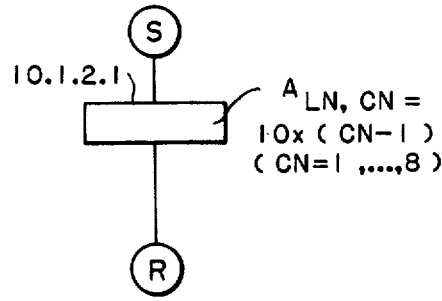
FIG. 12 is a flow chart showing the standard pitch determining procedure.

The aforementioned standard pitch determining step 10.1.2 shown in FIG. 11A is composed of the following step as shown in FIG. 12:

10.1.2.1:

$A_{LN,CN} = 10 \times (CN-1)$ ($CN = 1, 2, 3, ..., 8$) The lateral address of the print position of each character is calculated in dot units for a standard pitch of 10 pitch per character from the above-mentioned step and is stored in the print pitch buffer PPB.

Figure 13:
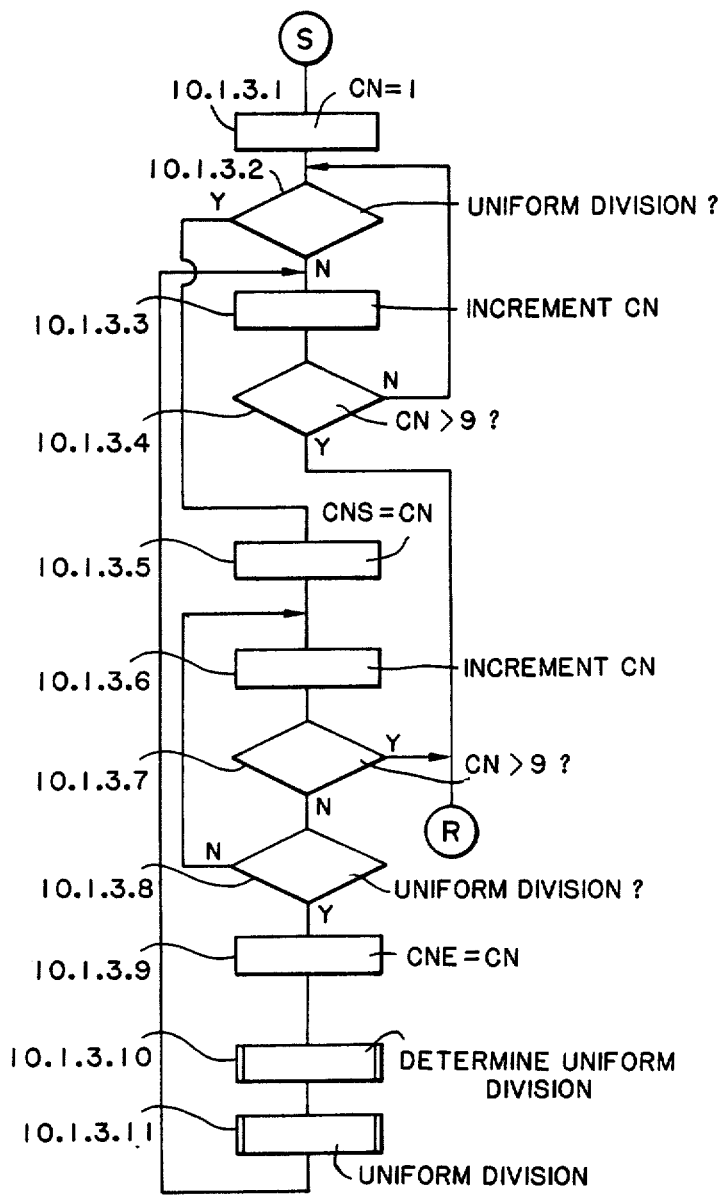
FIG. 13 is a flow chart showing the procedure for determining a uniformly divided pitch.

The aforementioned uniformly divided pitch determining process 10.1.3 is composed of the following steps as shown in FIG. 13:

10.1.3.1: $CN=1$;
10.1.3.2: Is $C_{LN,CN}$ a uniform division code UNIF.?
10.1.3.3: CN increment;
10.1.3.4 $CN>9$?
10.1.3.5: $CNS=CN$;
10.1.3.6: CN increment;
10.1.3.7: $CN>9$?
10.1.3.8: Is $C_{LN,CN}$ a uniform division code UNIF.?
10.1.3.9: $CNE=CN$;
10.1.3.10: Uniformly divided character number determining process; and
10.1.3.11: Uniformly dividing process:
wherein $C_{LN,CN}$ is a code in the data buffer DBUF for a line number LN and a column number CN, and CN is the column number.

Functions of these steps are as follows:

10.1.3.1.- 10.1.3.5: At first the starting position of the area to be uniformly divided, or the position of the first uniform division code UNIF, is set in CNS. The program returns to the original state from the Step 10.1.3.4 if no uniform division code UNIF. is located.

10.1.3.6 -10.1.3.9: The ending position of the area to be uniformly divided, or the position of the second uniform division code UNIF. is set in CNE. The program returns from the Step 10.1.3.7 if no uniform division code is UNIF. located.

10.1.3.10: The number NUM of characters to be uniformly divided is determined from the starting column SC and the ending column EC according to the uniformly divided character number step to be explained further in the following.

10.1.3.11: Uniformly dividing process for correcting the values in the print pitch buffer PPB, which will be explained further in the following, is executed from the head to the end of each line.

Figure 14:
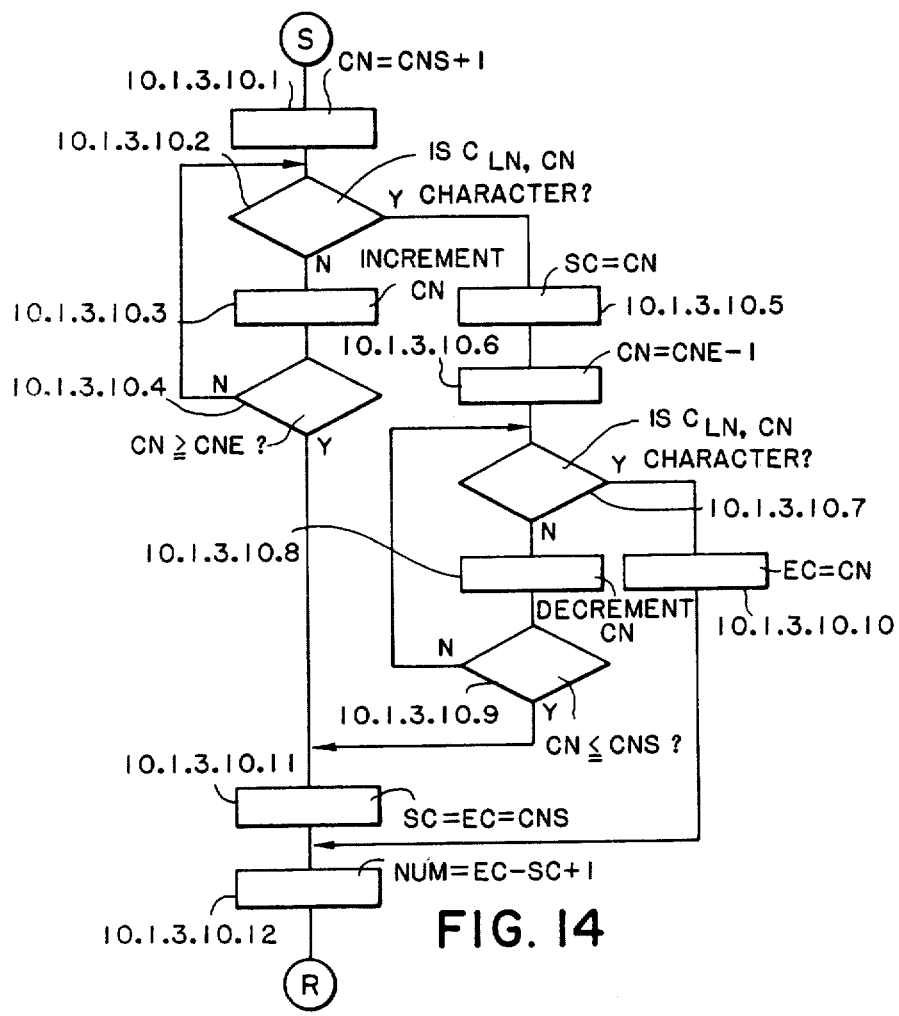
FIG. 14 is a flow chart showing the procedure for determining a uniformly divided number of characters.

The aforementioned uniformly divided character number determining process 10.1.3.10 shown in FIG. 13 is composed of the following steps, as shown in FIG. 14:

10.1.3.10.1: $CN=CNS+1$;
10.1.3.10.2: Is $C_{LN,CN}$ a character code?
10.1.3.10.3: CN increment;
10.1.3.10.4: $CN \geq CNE$;
10.1.3.10.5: $SC=CN$;
10.1.3.10.6: $CN=CNE-1$;
10.1.3.10.7: Is $C_{LN,CN}$ a character code?
10.1.3.10.8: CN decrement;
10.1.3.10.9: $CN \leq CNS$;
10.1.3.10.10: $EC=CN$;
10.1.3.10.11: $SC=EC=CNS$; and
10.1.3.10.12: $NUM=EC-SC+1$.

Functions of these steps are as follows:
10.1.3.10.1–10.1.3.10.5: The leading end of the character series to be uniformly divided in the area of uniform division defined by CNS and CNE is located (10.1.3.10.2) and set in SC (10.1.3.10.5) (see FIG. 11B). Said leading end shall be defined by the position of a first code other than the space code. If such series of characters is not found, the program proceeds to the Step 10.1.3.10.11.

10.1.3.10.6–10.1.3.10.10: The trailing end of the character series to be uniformly divided in the area of uniform division is found (10.1.3.10.7) and set in EC (10.1.3.10.10)(see FIG. 11B). Said trailing end shall be defined by the position of a first code from the end of said area other than the space code. The program proceeds to the Step 10.1.3.10.11 if such series of characters is not found, and otherwise proceeds to the Step 10.1.3.10.12.

10.1.3.10.11: This step is encountered if only space codes are found in said area. A condition $SC=EC=CNS$ is temporarily set though the uniform division becomes meaningless in this case.

10.1.3.10.12: The number NUM of characters to be uniformly divided in said area of uniform division is determined according to the equation: $NUM=EC-SC+1$.

Figure 15:
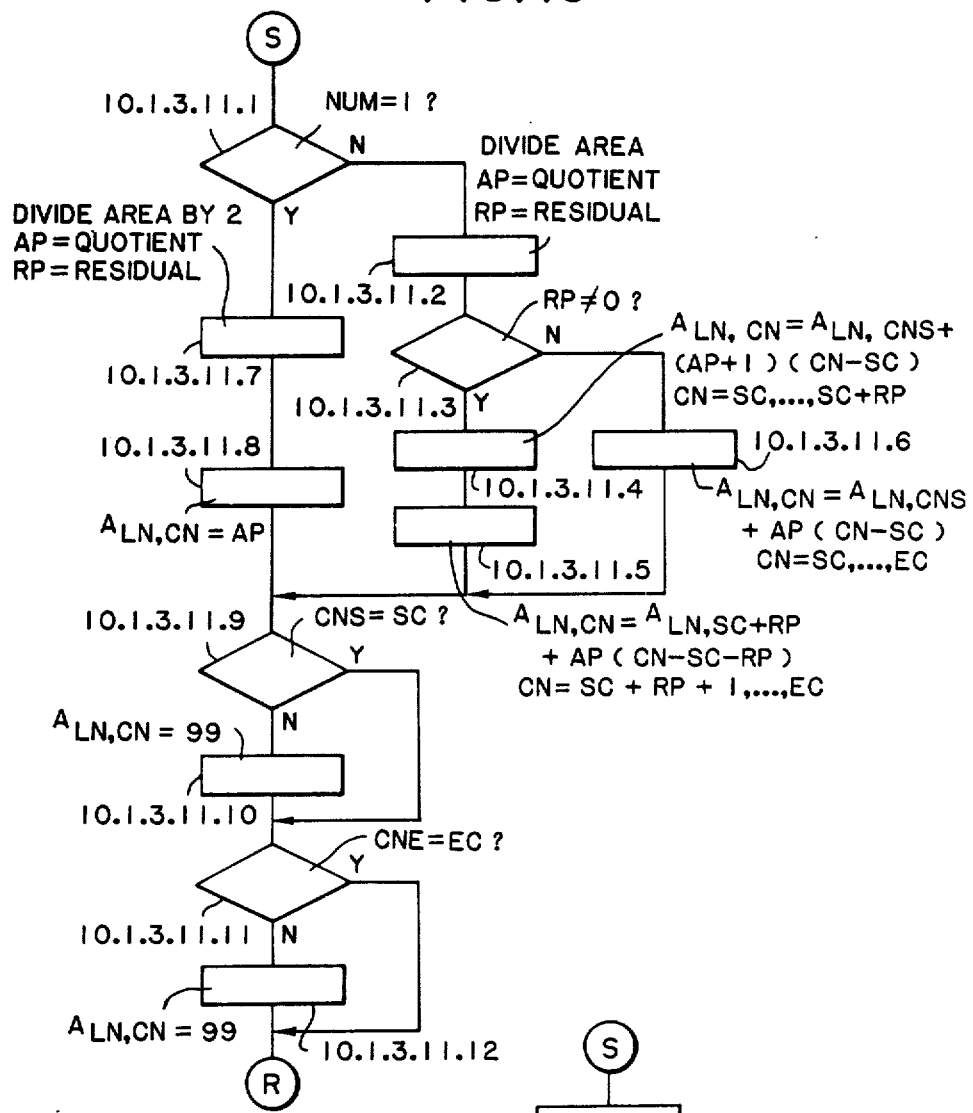
FIG. 15 is a flow chart showing the procedure of uniform division.

The aforementioned uniformly dividing step 10.1.3.11 shown in FIG. 13 is further composed of the following steps as shown in FIG. 15:

10.1.3.11.1: $NUM=1$?
10.1.3.11.2: Divide $A_{LN,CNE}-A_{LN,CNS}$ by $NUM-1$ to obtain the quotient AP and the residual RP;
10.1.3.11.3: $RP \neq 0$?
10.1.3.11.4:
  $A_{LN,CN}=A_{LN,CNS}+(AP+1)\times(CN-SC)$
  $(CN=SC, SC+1, ..., SC+RP)$;
1.3.11.5:
  $A_{LN,CN}=A_{LN,SC+RP}+AP\times(CN-SC-RP)$
  $(CN=SC+RP+1, SC+RP+2, ..., EC)$;
10.1.3.11.6:
  $A_{LN,CN}=A_{LN,CNS}+AP\times(CN-SC)$
  $(CN=SC, SC+1,..., EC)$;
10.1.3.11.7: Divide $A_{LN,CNE}+A_{LN,CNS}$ with 2 to obtain the quotient AP and the residual RP;
10.1.3.11.8: $A_{LN,CN}=AP$ ($CN=SC$);
10.1.3.11.9: $CNS=SC$?
10.1.3.11.10:
  $A_{LN,CN}=99$
  $(CN=CNS, ..., SC-1)$;
10.1.3.11.11: $CNE=EC$? and
10.1.3.11.12:

$A_{LN,CN}=99$
$(CN=EC+1, EC+2, \ldots, CNE)$.

Functions of these steps are as follows:

10.1.3.11.1: The program proceeds to the Step 10.1.3.11.7 when the number of characters to be uniformly divided is one, and otherwise proceeds to the Step 10.1.3.11.2.

10.1.3.11.2: The size of the area of uniform division $(A_{LN,CNE}- A_{LN,CNS})$ is divided with the number of characters to be uniformly divided minus one to obtain the quotient AP and the residual RP.

10.1.3.11.3: The program proceeds to the Step 10.1.3.11.4 or 10.1.3.11.6 respectively when RP≠0 or RP=0.

10.1.3.11.4: In a series of characters to be uniformly divided, the first characters of a number RP are adjusted to a pitch AP+1, according to the relation:
$A_{LN,CN}=A_{LN,CNS}+(AP+1)\times(CN-SC)$
$(CN=SC, SC+1,\ldots, SC=RP)$.

10 1.3.11.5: The remaining characters are adjusted to a pitch AP, according to the relation:
$A_{LN,CN}=A_{LN,SC+RP}+AP\times(CN-SC+RP)$
$(CN=SC+RP+1, SC+RP+2, \ldots, EC)$.

Then the program proceeds to the Step 10.1.3.11.9.

10.1.3.11.6: All the characters to be uniformly divided are adjusted to a pitch AP, according to the relation:
$A_{LN,CN}=A_{LN,CNS}+AP\times(CN-SC)$
$(CN=SC, SC+1, \ldots, EC)$.

Then the program proceeds to the Step 10.1.3.11.9.

10.1.3.11.7: If the number NUM of the characters to be uniformly divided is one, such character is to be printed in the center, the position of which is determined by dividing $A_{LN,CNE}+A_{LN,CNS}$ by 2 to obtain the quotient AP and the residual RP.

10.1.3.11.8: Said character is to be printed at the position AP according to:
$A_{LN,CN}=AP(CN=SC)$.

10.1.3.11.9: This step and the succeeding steps to 10.1.3.11.12 set all the printing positions to "99" in the area of uniform division other than those for the series of characters to be uniformly divided. At first a check is made to determine if a character is present other than that to be uniformly divided at the start position of said area. The program proceeds to the Step 0.1.3.11.11 if CNS=SC indicating the absence of such character, or to the Step 10.1.3.11.10 if CNS≠SC indicating the presence of such a character.

10.1.3.11.10: All the printing positions are set to "99" other than the character not to be uniformly divided in the area of uniform division, according to the condition:
$A_{LN,CN}=99$
$(CN=CNS, \ldots, CN-1)$.

10.1.3.11.11: A check is made to determine if a character not to be uniformly divided is present at the end of said area. The program returns in case of CNE=EC indicating the absence of such a character, or proceeds to the Step 10.1.3.11.12 in case of CNE≠EC indicating the presence of such a character.

10.1.3.11.12: All the printing positions are set to "99" other than the character not uniformly divided at the end of said area, according to:
$A_{LN,CN}=99$
$(CN=EC+1, EC+2, \ldots, CNE)$ The uniformly dividing process is completed in this manner.

Figure 16:
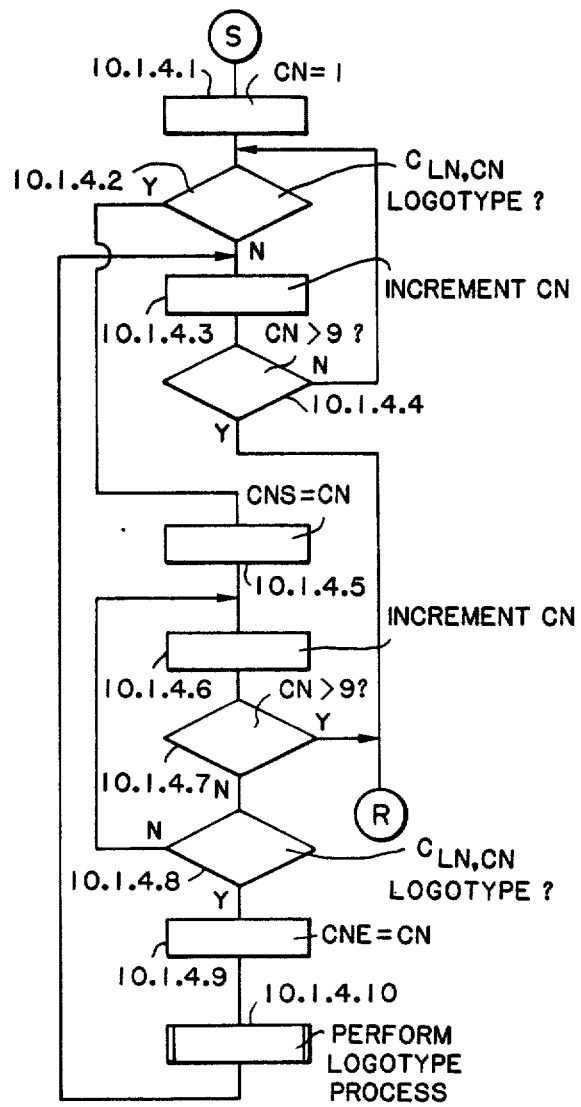
FIG. 16 is a flow chart showing the procedure for determining logotype printing pitch.

The aforementioned logotype pitch determining process 10.1.4 shown in FIG. 11 is further composed of the following steps, as shown in FIG. 16:

10.1.4.1: CN=1;
10.1.4.2: Is $C_{LN,CN}$ a logotype code L.?
10.1.4.3: CN increment;
10.1.4.4: CN>9?
10.1.4.5: CNS=CN;
10.1.4.6: CN increment;
10.1 4.7: CN>9?
10.1.4.8: Is $C_{LN,CN}$ a logotype code L.?
10.1.4.9: CNE=CN; and
10.1.4.10: logotype process.

Functions of these steps are as follows:

10.1.4.1–10.1.4"5: The starting position of the logotype area is searched from the head of line LN. The program returns if the starting position does not exist in said line (10.1.4.4). When said starting position is located (10.1.4.2) the number of the starting column is set in CNS (10.1.4.5).

10.1.4.6–10.1.4.9: The ending position of the logotype area is searched. The program returns if said ending position does not exist in said line (10.1.4.7). When said ending position is located (10.1.4.8) the number of the ending column is set in CNE (10.1.4.9).

10.1.4.10: The logotype process is conducted, in a manner as will be explained later, for determining the print position of the series of characters to be printed in logotype. Then the program proceeds to the Step 10.1.4.3 for searching another logotype area in said line.

Figure 17:
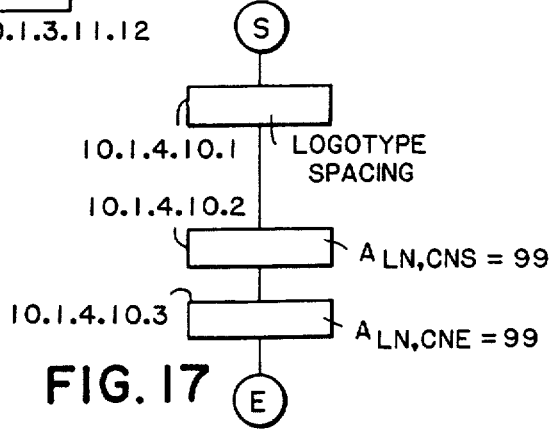
FIG. 17 is a flow chart showing the logotype process.

The aforementioned logotype process shown in FIG. 16 is further composed of the following steps, as shown in FIG. 17:

10.1.4.10.1:
$A_{LN,CN}=A_{LN,CNS+1}+7\times(CN-CNS-1)$
$(CN=CNS+1, CNS+2, \ldots, CNE-1)$;

10.1.4.10.2: $A_{LN,CNS}=99$; and
10.1.4.10.3: $A_{LN,CNE}=99$.

Functions of these steps are as follows:

1.4.10.1: All characters presented between two logotype codes shall be subjected to logotype printing. The leading character of said series remains unchanged in the printing position, but each of the following characters is printed so as to be positioned close to the preceding character with a pitch of 7 dots which are equal to the lateral length of the character (see FIG. 11B). This relation is represented by:
$A_{LN,CN}=A_{LN,CNS+1}+7\times(CN-CNS-1)$,
$(CN=CNS+1, CNS+2, \ldots, CNE-1)$.

10.1.4.10.2–10.1.4.10.3: Code "99" is set in the print positions of the starting and ending logotype codes defining the logotype area.

Figure 18:
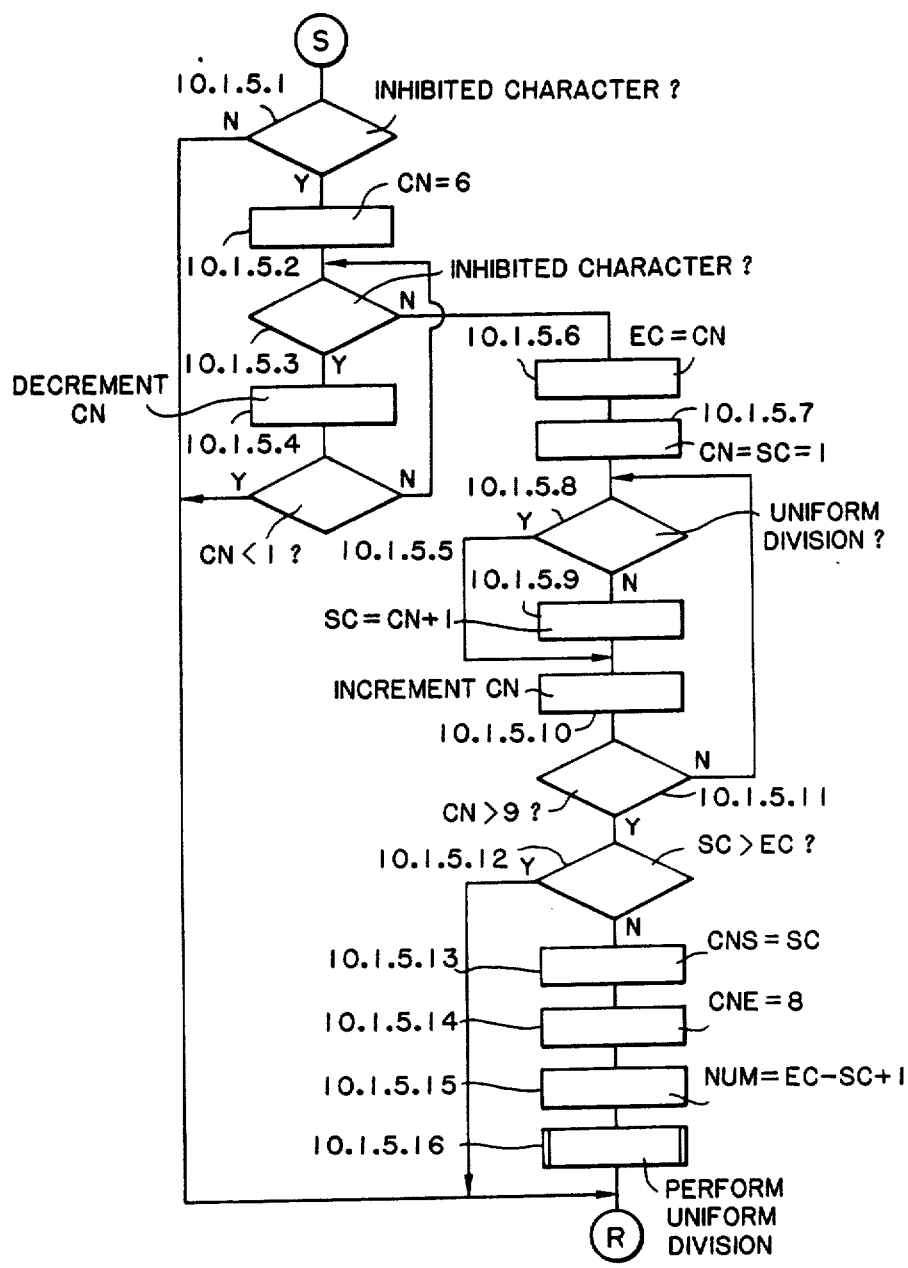
FIG. 18 is a flow chart showing the procedure for determining a character pitch in inhibited character processing.

The inhibited character processing pitch determining process 10.1.5 shown in FIG. 11A is further composed of the following steps as shown in FIG. 18:

10.1.5.1: Is $C_{LN,8}$ an inhibited character code INH.?
10.1.5.2: CN=6;
10.1.5.3: Is $C_{LN,LN}$ an inhibited character code INH.?
10.1.5.4: CN decrement;
10.1.5.5: CN<1;
10.1.5.6: EC=CN;
10.1.5.7: CN=1, SC=1;
10.1.5.8: Is $C_{LN,LN}$ a uniform division code UNdF. or a logotype code L.?
10.1.5.9: SC=CN+1;
10.1.5.10: CN increment;
10.1.5.11: CN>9?

10.1.5.12: SC>EC?
10.1.5.13: CNS=SC;
10.1.5.14: CNE=8;
10.1.5.15: NUM=EC−SC+1; and
10.1.5.16: Uniformly dividing process (10.1.3.11).

Functions of these steps are as follows:

10.1.5.1: A check is made to determine if an inhibited character code INH. is present at the line end, and, if absent, the program returns. If present, the program proceeds to the Step 10.1.5.2.

10.1 5.2–10.1.5.6: In case there is an inhibited character code INH. or are plural inhibited character codes INH. in succession, a position immediately preceding said code or codes is selected as the end of characters to be uniformly divided. Thus the first character code from the end other than the inhibited character code INH. is located (10.1.5.3) and the column position thereof is set in EC (10.1.5.6).

10.1.5.7–10.1.5.11: The series of characters to be subjected to uniform division generally starts from the head of a line, but it starts from a position next to a uniform division code UNF. or a logotype code if such code L. is present in the middle of a line. Thus the character codes are checked from the head of said line for determining the starting position of the characters to be subjected to the uniform division (10.1.5.8). The starting column number SC of said characters is initially set at "1" but is renewed (10.1.5.9) if it is identified as necessary (10.1.5.8).

10.1.5.12: SC is compared with EC, and, if SC≦EC, the program proceeds to the Step 10.1.5.13 as the uniform division step is possible. The program returns in case of SC>EC.

10.1.5.13: The starting column number of the uniformly divided area is set in CNS, i.e. CNS=SC.

10.1.5.14: The ending column number of the uniformly divided area is set in CNE, i.e. CNE=8.

10.1.5.15: The number of characters to be subjected to uniform division is calculated according to the equation:
NUM=EC−SC+1

10.1.5.16: The print positions of characters are determined according to the uniformly dividing step 10.1.3.11.

The inhibited character process pitch determining step is conducted in the above-mentioned manner.

Figure 19:
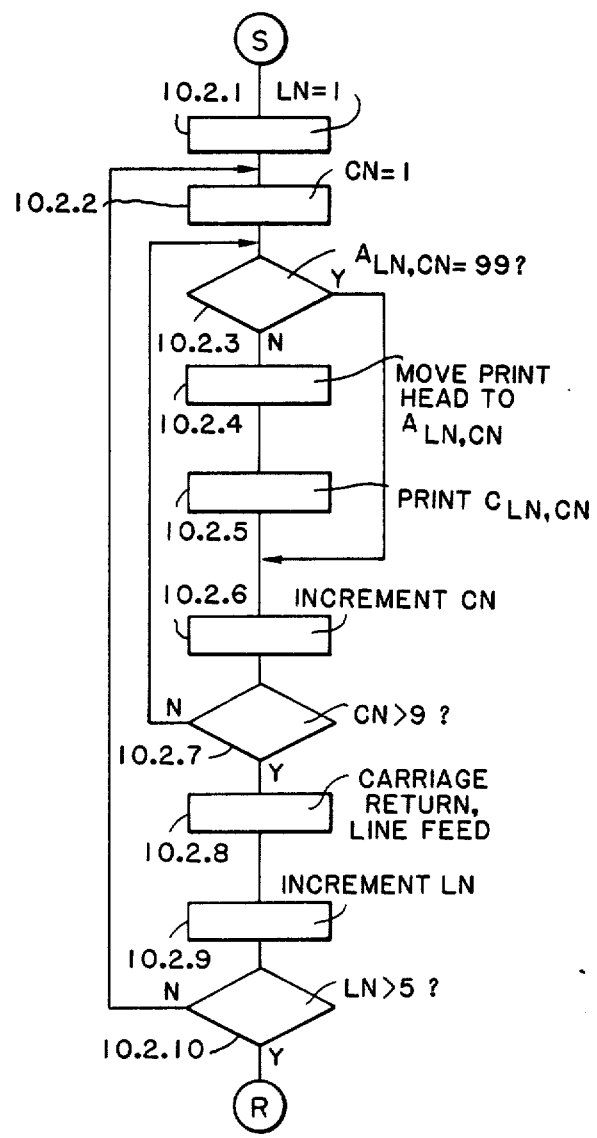
FIG. 19 is a flow chart showing the printing procedure.

The print step 10.2 shown in FIG. 10 is further composed of the following steps, as shown in FIG. 19:

10.2.1: LN=1;
10.2.2: CN=1;
10.2.3: $A_{LN,CN}$=99?
10.2.4: Advance the printer head to a position represented by $A_{LN,CN}$;
10.2.5: Supply a graphic pattern represented by a code $C_{LN,CN}$ from the character generator CG to the printer PRT;
10.2.6: CN increment;
10.2.7: CN>9?
10.2.8: Give commands carriage return and line feed to the printer;
10.2.9: LN increment;
10.2.10: LN>5?

Functions of these steps are as follows:

10.2.1, 10.2.9 and 10.2.10: Print is made for each line from the first to the last line.

10.2.2, 10.2.6 and 10.2.7: Print is made for each character from the first to the last column.

10.2.3: A character having the code "99" is not printed, and the program thus proceeds to the Step 10.2.5. Otherwise it proceeds to the Step 10.2.3.

10.2.4: The printing head is advanced to the print position by a head advancing instruction given to the printer controller PRTC.

10.2.5: A character is printed by obtaining a character pattern from the character generator CG corresponding to the character code ($C_{LN,CN}$) of said character, and supplying said pattern to the printer controller PRTC. Then the program proceeds to the Step 10.2.6.

10.2.8: Carriage return and line feed commands are instructed to the PRT through the printer controller PRTC.

The print step is conducted in the above-mentioned manner.

The foregoing explains the manner of word processing according to the present invention.

What is claimed is:

1. A word processing apparatus comprising:
input means for entering a plurality of character codes and a discrimination code to discriminate a first group of said plurality of character codes, said input means comprising a plurality of input keys for entering said plurality of character codes and said discrimination code;
memory means for storing said plurality of character codes and said discrimination code entered by said input means;
first control means connected to said memory means for discriminating said first group of character codes discriminated by said discrimination code and a second group of character codes that is not discriminated by said discrimination code; and
second control means connected to said memory means for controlling a character pitch of said first group of said plurality of character codes discriminated, so as to be different from a character pitch of said second group of said plurality of character codes that is not discriminated, said character pitch of said first group of said plurality of character codes remaining unaltered even if the number of character codes thereof is varied, and said character pitch of said second group of said plurality of character codes being controlled by said second control means so as to vary the character pitch thereof when the number of character codes thereof is varied.

2. A word processing apparatus according to claim 1, wherein said second control means comprises means for recording said first group of said plurality of character codes discriminated by said discrimination code with substantially zero spacing therebetween.

3. A word processing apparatus according to claim 1, wherein said first control means discriminates said first group of said plurality of character codes by a discrimination code at the beginning and at the end of said first group of said plurality of character codes.

4. A word processing apparatus according to claim 1, further comprising display control means for displaying said first group of said plurality of character codes and said second group of said plurality of character codes, said display control means displaying said fir character codes and said second group of said plurality of character codes with the same character pitch.

5. A word processing apparatus comprising:

input means for entering a plurality of character codes and a discrimination code to discriminate a first group of said plurality of character codes, said input means comprising a plurality of input keys for entering said plurality of character codes and said discrimination code;

memory means for storing said plurality of character codes and said discrimination code entered by said input means;

first control means connected to said memory means for discriminating said first group of character codes discriminated by said discrimination code and a second group of character codes that is not discriminated by said discrimination code;

second control means connected to said memory means for controlling a character pitch of said first group of said plurality of character codes discriminated by said first control means so as to be different from a character pitch of said second group of said plurality of character codes that is not discriminated, said character pitch of said first group of said plurality of character codes remaining unaltered even if the number of character codes thereof is varied, and said character pitch of said second group of said plurality of character codes being controlled by said second control means so as to vary the character pitch thereof when the number of character codes thereof is varied;

pattern memory means for storing a plurality of patterns each corresponding to one of said plurality of character codes stored in said memory means; and record means, connected to said memory means and said pattern memory means, and responsive to said second control means, for reading out from said pattern memory means a plurality of patterns corresponding to a combination of said plurality of character codes.

6. A word processing apparatus according to claim 5, wherein the plurality of patterns stored in said pattern memory means includes character patterns.

7. A word processing apparatus according to claim 5, wherein said record means comprises means for recording a plurality of patterns based upon said plurality of character codes so that at least two of said plurality of patterns are continuous.

8. A word processing apparatus comprising:

input means for entering a plurality of character codes and a discrimination code to discriminate a first group of said plurality of character codes, said input means comprising a plurality of input keys for entering said plurality of character codes and said discrimination code;

memory means for storing said plurality of character codes and said discrimination code entered by said input means;

first control means connected to said memory means for discriminating said first group of character codes discriminated by said discrimination code and a second group of character codes that is not discriminated by said discrimination code;

second control means connected to said memory means for controlling a character pitch of said first group of said plurality of character codes discriminated by said first control means so as to be different from a character pitch of said second group of said plurality of character codes that is not discriminated, said character pitch of said first group of said plurality of character codes remaining unaltered even if the number of character codes thereof is varied, and said character pitch of said second group of said plurality of character codes being controlled by said second control means so as to vary the character pitch thereof when the number of character codes thereof is varied;

pattern memory means for storing a plurality of character patterns, each corresponding to one of said character codes storing in said memory means; and recording means connected to said memory means and said pattern memory means, and responsive to said second control means for reading out character patterns from said pattern memory means that correspond to the first and second plurality of character codes, for recording each of the character patterns corresponding to said first and second plurality of character codes.

9. A word processing apparatus according to claim 8, wherein said input means comprises a keyboard.

* * * * *

UNITED STATES PATENT AND TRADEMARK OFFICE
CERTIFICATE OF CORRECTION

PATENT NO. : 4,907,193

DATED : March 6, 1990

INVENTOR(S) : Katsumi Masaki

Page 1 of 6

It is certified that error appears in the above-identified patent and that said Letters Patent is hereby corrected as shown below:

On the title page,
[63] Related U.S. Application Data:

"Aug. 14, 1980," should read --Aug. 14, 1984,--.

On the title page,
[56] References Cited:

U.S. PATENT DOCUMENTS

"McConell et al." should read --McConnell et al.--.

"Pozi" should read --Pou--.

FOREIGN PATENT DOCUMENTS

"37793 11/1981 European Pat. Off." should read
--39393 11/1981 European Pat. Off.--.

Assistant Examiner

"Florin Munteanu-r" should read --Florin Munteanu--.

UNITED STATES PATENT AND TRADEMARK OFFICE
CERTIFICATE OF CORRECTION

PATENT NO. : 4,907,193

DATED : March 6, 1990

INVENTOR(S) : Katsumi Masaki

It is certified that error appears in the above-identified patent and that said Letters Patent is hereby corrected as shown below:

OTHER PUBLICATIONS

"J.J. Ignoffo et al., "Managing Dot-Matrix Printing With a Microprocessor" Hewlet-Packard Journal (Vol. 29, No. 15, Nov. 1978).", should read --J. J. Ignoffo, et al. "Managing Dot-Matrix Printing With a Microprocessor," Hewlet-Packard Journal (Vol. 29, No. 15, Nov. 1978) pp. 8-19.--.

On the title page,

[57] ABSTRACT:

"and is" should read --being so--.

COLUMN 1:

Line 41, "controlled," should read --controlled--.

COLUMN 2:

Line 4, "a" should read --of a--.

Line 43, "grammatrical" should read --grammatical--.

Line 55, "grammatrical" should read --grammatical--.

UNITED STATES PATENT AND TRADEMARK OFFICE
CERTIFICATE OF CORRECTION

PATENT NO. : 4,907,193

DATED : March 6, 1990

INVENTOR(S) : Katsumi Masaki

It is certified that error appears in the above-identified patent and that said Letters Patent is hereby corrected as shown below:

COLUMN 4:

Line 12, "data DBUF" should read --data buffer DBUF--.

COLUMN 5:

Line 21, "executes," should read --executes--.

Line 23, "is" (second occurrence) should be deleted.

Line 29, "enter" should read --entry--.

Line 57, "tee" should read --the--.

COLUMN 6:

Line 35, "back" should be deleted.

COLUMN 7:

Line 18, "filled" should read --is filled--.

Line 60, "three," should read --three--.

UNITED STATES PATENT AND TRADEMARK OFFICE
CERTIFICATE OF CORRECTION

PATENT NO. : 4,907,193

DATED : March 6, 1990

INVENTOR(S) : Katsumi Masaki

It is certified that error appears in the above-identified patent and that said Letters Patent is hereby corrected as shown below:

COLUMN 8:

Line 9, "if," should read --if--.

Line 13, "the" (second occurrence) should be deleted.

Line 25, "0.2:" should read --10.2:--.

Line 29, "data buffer" should read --data buffer DBUF--.

Line 35, "0.1.3:" should read --10.1.3:--.

COLUMN 9:

Line 61, "is UNIF." should read --UNIF. is--.

COLUMN 10:

Line 54, "1.3.11.5" should read --10.1.3.11.5:--.

COLUMN 11:

Line 20, "10 1.3.11.5:" should read --10.1.3.11.5:--.

UNITED STATES PATENT AND TRADEMARK OFFICE
CERTIFICATE OF CORRECTION

PATENT NO. : 4,907,193

DATED : March 6, 1990

INVENTOR(S) : Katsumi Masaki

It is certified that error appears in the above-identified patent and that said Letters Patent is hereby corrected as shown below:

COLUMN 12:

Line 15, "10.1.4.1-10.1.4"5:" should read
    --10.1.4.1-10.1.4.5:--.

Line 41, "1.4.10.1:" should read --10.1.4.10.1:--.

Line 64, "uniform division code UNdF." should read
    uniform division code UNIF.--.

COLUMN 13:

Line 22, "uniform division code UNF." should read
    --uniform division code UNIF.--; and, "logotype
    code" should read --logotype code L.--.

Line 23, "L." should be deleted.

COLUMN 14:

Line 14, "PRT" should read --printer PRT--.

Line 65, "fir character" should read --first group
    of said plurality of character--.

UNITED STATES PATENT AND TRADEMARK OFFICE
CERTIFICATE OF CORRECTION

PATENT NO. : 4,907,193

DATED : March 6, 1990

INVENTOR(S) : Katsumi Masaki

It is certified that error appears in the above-identified patent and that said Letters Patent is hereby corrected as shown below:

COLUMN 16:

Line 34, "storing" should read --stored--.

Signed and Sealed this

Sixteenth Day of March, 1993

Attest:

STEPHEN G. KUNIN

*Attesting Officer*     Acting Commissioner of Patents and Trademarks